United States Patent
Arksey (10) Patent No.: US 10,368,472 B2
(45) Date of Patent: Aug. 6, 2019

(54) DISC OPENER SCRAPER WITH INSERT FOR STRAW WRAP PREVENTION, WEAR REDUCTION AND SEED GUIDANCE, AND WELDED SLOT-POSITIONED WING MEMBER

(71) Applicant: Atom Jet Industries (2002) Ltd., Brandon (CA)

(72) Inventor: Donald Arksey, Forrest (CA)

(73) Assignee: Atom Jet Industries (2002) Ltd, Brandon (CA)

( * ) Notice: Subject to any disclaimer, the term of this patent is extended or adjusted under 35 U.S.C. 154(b) by 178 days.

(21) Appl. No.: 15/480,834

(22) Filed: Apr. 6, 2017

(65) Prior Publication Data

US 2018/0288930 A1  Oct. 11, 2018

(51) Int. Cl.
| | |
|---|---|
| *A01B 23/06* | (2006.01) |
| *A01C 5/06* | (2006.01) |
| *A01C 7/06* | (2006.01) |

(52) U.S. Cl.
CPC .............. *A01B 23/06* (2013.01); *A01C 5/064* (2013.01); *A01C 7/06* (2013.01)

(58) Field of Classification Search
CPC ........... A01C 5/064; A01C 5/062; A01B 7/00; A01B 9/00
See application file for complete search history.

(56) References Cited

U.S. PATENT DOCUMENTS

| 4,337,836 A * | 7/1982 | Seaberg | E02F 3/7618 172/826 |
|---|---|---|---|
| 7,540,246 B2 * | 6/2009 | Friesen | A01C 5/064 111/167 |
| 7,568,438 B2 * | 8/2009 | Arksey | A01C 5/064 111/121 |
| 8,511,241 B2 * | 8/2013 | Swanson | A01C 5/064 111/119 |
| 2007/0044694 A1 * | 3/2007 | Martin | A01C 5/064 111/121 |
| 2007/0062714 A1 * | 3/2007 | Harmon | A01B 23/06 172/566 |

(Continued)

FOREIGN PATENT DOCUMENTS

CA    2704558 A1 *  5/2011   ............ A01C 5/068

*Primary Examiner* — Thomas B Will
*Assistant Examiner* — Joel F. Mitchell
(74) *Attorney, Agent, or Firm* — Kyle R Satterthwaite; Ryan W Dupuis; Ade & Company Inc.

(57) ABSTRACT

A unique scraper assembly for the disc of a furrow opener features an obstruction carried at inner side of the scraper body in a position trailing behind the leading scraper edge to prevent straw from accumulating in the space between the disc and scraper near the leading scraper edge, to block seed or other product delivered into the furrow from skipping forward into this space, to reduce wear on the leading scraper edge by increasing an area of pressured contact with the disc during side loading of the scraper, and/or provide lubricated contact with the disc to reduce rotational resistance during side loading. In some embodiments, the obstruction is defined by a separate insert of distinct material composition from the scraper. A discrete wing member is welded to the scraper at a pre-determined position thereon determined by fitting of the wing member into a mating slot in the scraper.

27 Claims, 4 Drawing Sheets

(56) References Cited

U.S. PATENT DOCUMENTS

| | | | |
|---|---|---|---|
| 2010/0230124 A1* | 9/2010 | Martin | A01B 23/06 172/559 |
| 2012/0079973 A1* | 4/2012 | Swanson | A01C 5/064 111/163 |
| 2015/0334915 A1* | 11/2015 | Mead | A01C 5/064 111/170 |
| 2016/0113187 A1* | 4/2016 | Hesla | A01B 23/06 172/1 |
| 2017/0280616 A1* | 10/2017 | Gervais | A01C 5/064 |

* cited by examiner

DISC OPENER SCRAPER WITH INSERT FOR STRAW WRAP PREVENTION, WEAR REDUCTION AND SEED GUIDANCE, AND WELDED SLOT-POSITIONED WING MEMBER

FIELD OF THE INVENTION

The present invention relates generally to disc-based furrow openers, and more particularly to improved disc-scraper arrangements for same.

BACKGROUND

Applicant's prior U.S. Pat. No. 7,568,438, the entirety of which is incorporated herein by reference, discloses a disc furrow opener in which a scraper is carried alongside the disc to clear soil buildup therefrom, while also forming a shelf in the side of the disc-cut furrow to enable separate placement of seed and fertilizer at the shelf and the furrow bottom. A leading front edge of the scraper resides in contact or close proximity to the disc to perform the scraping action, and the scraper angles obliquely outward from this edge to form a space between the disc and the scraper into which seed and fertilizer are safely delivered to the shelved furrow behind the cover of the scraper. Select embodiments includes a carbide wing projecting laterally from the scraper at the outer side thereof opposite the disc in order to widen the shelf area cut into the side of the primary furrow.

U.S. Pat. No. 7,540,246, the entirety of which is incorporated herein by reference, also teaches a disc furrow opener with a winged scraper, but the wing is formed integrally with the scraper and cuts into the wall of the disc's primary furrow, rather than into a scraper-formed shelf area.

In use of Applicant's prior design, it has been found that straw may become wrapped up between the scraper and the disc at the front portion of the scraper that angles obliquely outward from the disc in trailing relation to the leading scraper edge. Also, side load forces exerted on the scraper toward the disc during use are concentrated on the leading edge's small contact area with the disc, which may therefore wear at a notable rate. Additionally, seeds inadvertently bouncing forward when dropped into the furrow can become trapped in the tapered space between the disc and angled front portion of the scraper, or escape through any small space that may be open between the leading scraper edge and the disc.

In the case of a wing used to widen a scraper-formed shelf or open a slot in the primary furrow of the disc, use of carbide to form the entirety of the wing increases the cost of the winged scraper versus selective use of carbide at only the most wear-prone leading and outer edge of the wing.

Accordingly, there remains room for improvement of scraper-equipped disc openers. Applicant discloses herein unique opener designs and methods that may be useful to solve or mitigate the foregoing shortcomings of the prior art.

SUMMARY OF THE INVENTION

According to a first aspect of the invention, there is provided a furrow opener comprising:
 a disc arranged to be displaced across an area of ground in a forward working direction to open a primary furrow in the ground;
 a scraper assembly comprising:
  a scraper body extending generally rearward from a leading scraper edge of the scraper body to a rear trailing edge of the scraper body, the leading scraper edge of the scraper body being supported alongside the disc in contact or proximity thereto to scrape soil buildup therefrom; and
  an obstruction carried in a position trailing closely behind the leading scraper edge on an inner side of the scraper body facing the disc, said obstruction spanning at least a majority of a length of the leading scraper edge and providing the scraper assembly with an increased thickness at the position of the obstruction relative to a thickness of the scraper assembly at the leading scraper edge.

Preferably the obstruction comprises a different and distinct material composition than a material composition of the scraper body at the leading scraper edge thereof.

Preferably the obstruction comprises polymeric material.

Preferably the obstruction comprises self-lubricating material.

Preferably the obstruction comprises low friction material, at least at an inner disc-facing side thereof.

Preferably the obstruction comprises a material of lesser friction coefficient than a constituent material of a remainder of the scraper body, at least at an inner disc-facing side of said obstruction.

Preferably the obstruction comprises ultra-high molecular weight polyethylene.

Preferably the obstruction tapers in shape toward the leading scraper edge.

Preferably the obstruction is defined by an insert body that is separate and distinct from the scraper body, and that spans at least a majority of a gap width measured between the scraper body and the disc at the location of said obstruction.

Preferably the insert body occupies a space delimited between said scraper body and said disc at an angled portion of said scraper body that extends rearward from the leading scraper edge at an oblique angle to the disc.

Preferably said insert body tapers toward a leading edge of said insert body at taper angle that matches an angle of convergence between the disc and the angled portion of the scraper body toward the leading scraper edge.

Preferably the obstruction is carried by the scraper body.

Preferably the obstruction is releasably fastened to the scraper body.

Preferably the scraper body comprises a front section extending from the leading scraper edge in a position trailing same, and a rear portion continuing rearward from the front portion, wherein the obstruction spans at least a majority of said front portion of the scraper body, and less than a majority of said rear portion of the scraper body.

Preferably the front portion of the scraper body lies at a first angle relative to the disc, and the rear portion lies at a different relative angle to the disc than said front portion.

There may be a product delivery tube reaching downward into a space between the disc and the rear portion of the scraper body to deliver product into the furrow at a location trailing behind the obstruction.

According to a second aspect of the invention, there is provided a method of using a furrow opener, said method comprising:
 conveying a disc of a furrow opener across an area of ground such that said disc opens a furrow within said ground while a scraper of said furrow opener scrapes soil buildup from said disc; and
 while conveying said disc and scraping said soil buildup, using an obstruction positioned at an inner side of the scraper in trailing relationship to a leading scraper edge thereof to perform at least one of the following steps:

(a) preventing straw, soil and/or other material from accumulating in a space between said disc and said scraper near the leading scraper edge;

(b) reducing wear on the leading edge of said scraper by increasing an area of pressured contact with the disc when the scraper is subjected to side loading forces acting on said scraper toward said disc;

(c) while delivering product into the furrow via a product delivery tube reaching down between the scraper and the disc, blocking said product from entering the space between the disc and the scraper near the leading scraper edge;

(d) providing lubricated contact with the disc to reduce rotational resistance at the disc when the scraper is subject to side loading.

According to a third aspect of the invention, there is provided a furrow opener comprising:

a disc arranged to be displaced across an area of ground in a forward working direction to open a primary furrow in the ground;

a scraper assembly comprising:
 a scraper body extending generally rearward from a leading scraper edge of the scraper body to a rear trailing edge of the scraper body, the leading scraper edge of the scraper body being supported alongside the disc in contact or proximity thereto to scrape soil buildup therefrom; and
 a self-lubricating material carried at an inner side of the scraper body that faces the disc for lubricated contact with the disc when the scraper is subjected to side loading forces acting on said scraper assembly toward said disc.

Preferably the self-lubricating material is provided by an insert body that is separate and distinct from the scraper body and is carried in a position located between the disc and the scraper body in close trailing relation to the leading scraper edge.

Preferably the insert member is composed entirely of said self-lubricating material.

According to a fourth aspect of the invention, there is provided a furrow opener comprising:

a disc arranged to be displaced across an area of ground in a forward working direction to open a primary furrow in the ground;

a scraper body extending generally rearward from a leading scraper edge of the scraper body to a rear trailing edge of the scraper body, the leading scraper edge of the scraper body being supported alongside the disc in proximity thereto to scrape soil buildup therefrom; and a wing member formed separately of the scraper body and attached thereto to project laterally therefrom to an outer side thereof opposite the disc;

one or more edge members of greater material hardness than said wing member affixed to said wing member along exposed edges thereof at the outer side of the scraper body.

Preferably the scraper body comprises a pre-defined seat therein in which the wing member is seated.

Preferably the pre-defined seat comprises a slot for receiving the wing member.

Preferably the slot has an open end by which the wing member is longitudinally received in said slot.

Preferably said slot is inclined relative to a bottom edge of the scraper body and cuts into said scraper body from said bottom edge.

Preferably the wing member comprises a stepped profile at an inner side thereof that forms a shoulder of said wing member that is abutted against said scraper body.

Preferably the wing member is welded to the scraper body.

Preferably the one or more edge members are brazed to the wing member.

Preferably the one or more edge members comprise metal carbide.

Preferably the metal carbide comprises tungsten carbide.

Preferably the wing member is welded to the scraper body and the one or more edge members comprise at least one edge member situated at a spaced distance outward from the scraper body and attached to the wing member by a brazed joint, whereby spacing of said at least one edge member from the scraper body by the wing member reduces exposure of the brazed joint to heat during welding of the wing member to the scraper body.

According to a fifth aspect of the invention, there is provided a method of producing a winged disc scraper member for a furrow opener, said method comprising, with a wing member having one or more edge members pre-brazed thereto at one or more outer edges thereof by one or more brazed joints, welding said wing member to the disc scraper at an inner edge thereof that resides in a spaced condition across said wing member from said one or more outer edges thereof, whereby the spaced condition between the outer edges featuring the pre-brazed edge members and the inner edge being welded to the scraper body reduces exposure of said one or more brazed joints to heat during welding of the wing member to the scraper body.

According to a sixth aspect of the invention, there is provided a method of producing a winged disc scraper member for a furrow opener, said method comprising, placing a wing member into a predefined seat in a scraper body to position said wing-member in a predetermined position ready for permanent attachment to said scraper body in a useful position projecting laterally from said scraper body at an outer side thereof.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1:
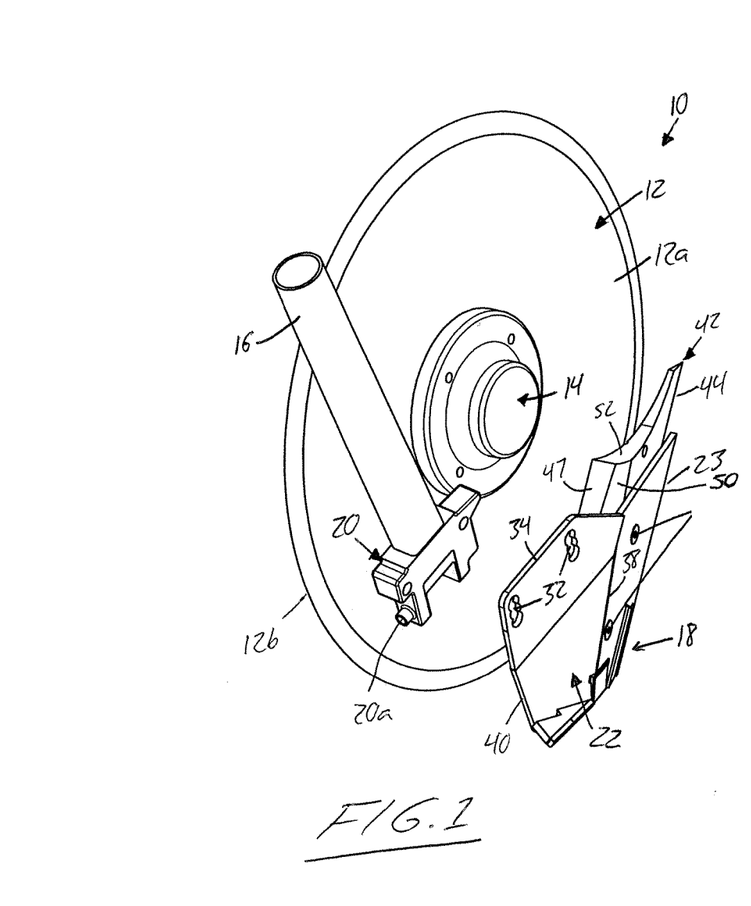
FIG. 1 is a partially exploded rear/side view of a disc opener assembly featuring a winged scraper and a unique insert member received between the winged scraper and the disc to prevent straw buildup, reduce scraper wear, and improve product placement in the furrow.
Figure 2:
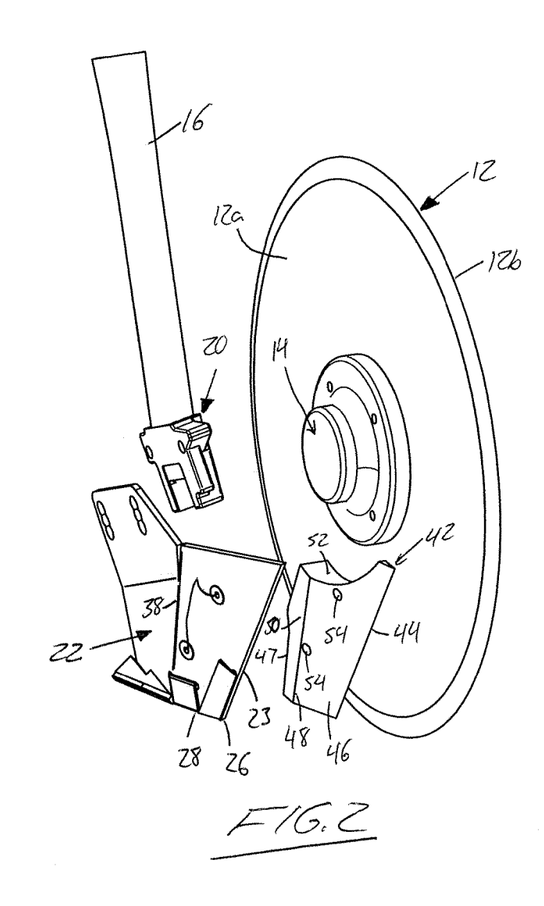
FIG. 2 is a partially exploded front/side view of the disc opener assembly of FIG. 1.

FIG. 1 shows the primary components of a disc-type furrow opener for an air seeding or similar piece of agricultural equipment for opening a furrow in the ground to place seed, fertilizer or other product therein. In a conventional manner, the opener 10 features a carrying arm (not shown) on which a disc 12 is supported for fee rotation by an axle hub assembly 14 in a manner well-known to those of skill in the art. The carrying arm is pulled on the drawbar (not shown) of the air seeder, which is driven in a forward working direction with the disc 12 slightly angled relative thereto, thereby defining opposite surfaces of the disc as leading and trailing faces, the latter of which is seen at 12a. A product delivery tube 16 (e.g. seed tube or fertilizer tube for delivering seed or granular fertilizer) depends downward from the carrying arm on the trailing side of the disc 12. A scraper 18 is carried by the product delivery tube as a result of being fastened to a lower boot 20 that is affixed to the bottom end of the product delivery tube to both provide a product outlet from which the seed or fertilizer is delivered into the furrow, and a mount to which the scraper is fastenable. Alternatively, the scraper may be fastened to a separate mount independent of the product delivery tube, for example to a dedicated scraper mount hanging down from the carrying arm, for example as illustrate and described in Applicant's aforementioned prior patent. A main body 22 of the scraper is defined by one or more metal plates 22, for example a singular bent and formed into the described shape, or a set of multiple plates welded together generally edge-to-edge to retain an overall plate-like form, but at relative angles to one another to create the described overall shape. The resulting main body 22 features a leading scraper edge 23 positioned in contact or close proximity to the trailing face 16a of the disc 16 in a manner well-known to those of skill in the art so as to scrape soil from the disc during operation of the opener 12.

Figures 3, 4:
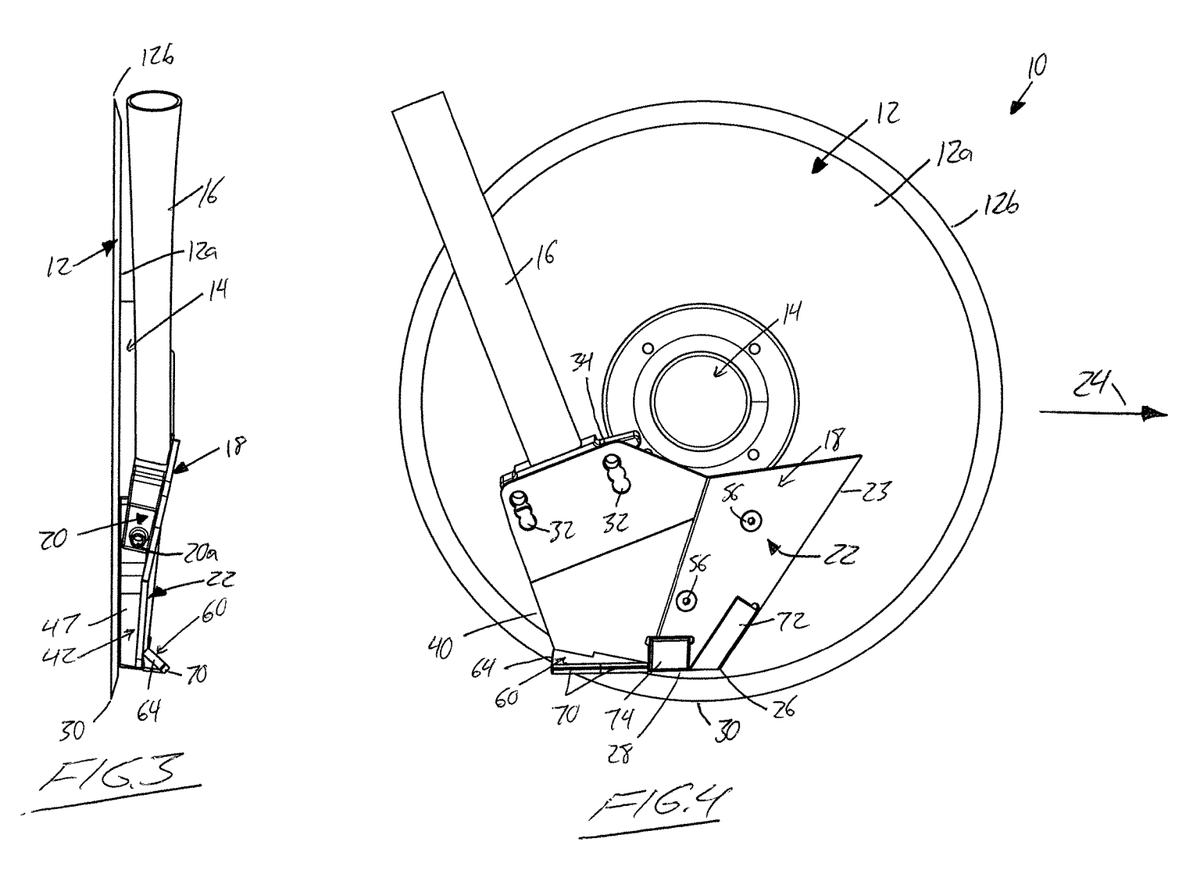
FIG. 3 is a rear elevational view of the disc opener assembly of FIG. 1 in its fully assembled state.
FIG. 4 is a side elevational view of the disc opener assembly of FIG. 1 in its fully assembled state.
Figure 5:
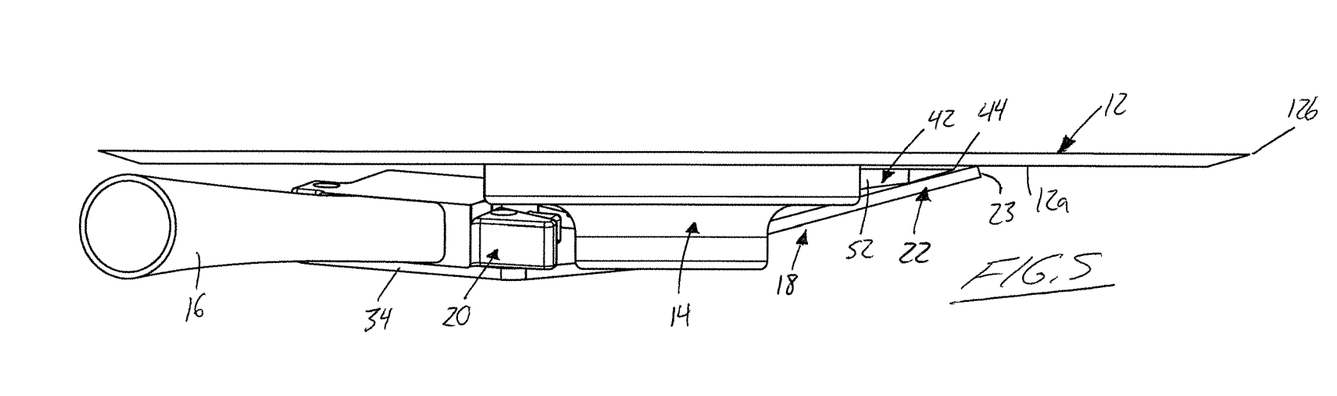
FIG. 5 is a top plan view of the disc opener assembly of FIG. 1 in its fully assembled state.
Figure 6:
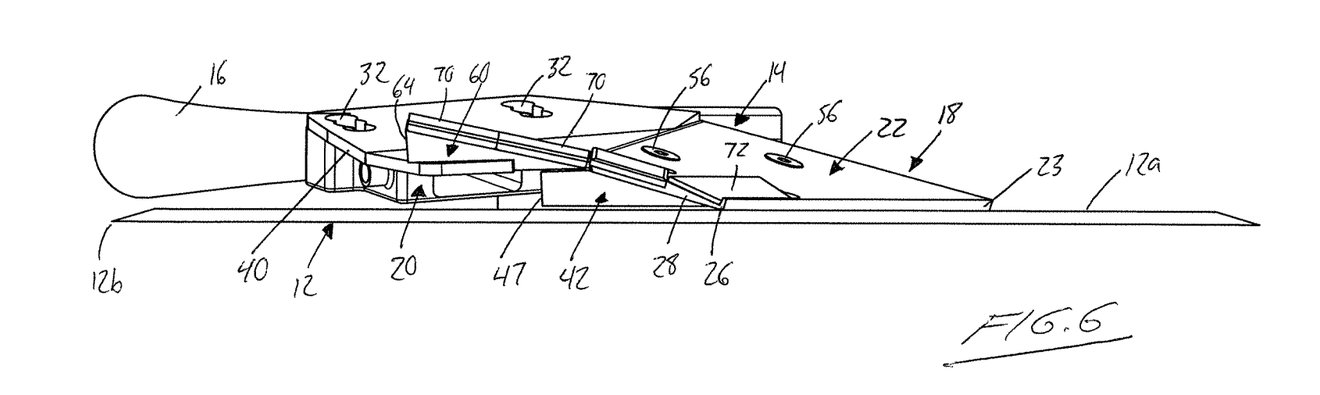
FIG. 6 is a bottom plan view of the disc opener assembly of FIG. 1 in its fully assembled state.

In the following description, the terms forward, rearward, leading, trailing and variations of these words are used relative to the forward working direction in which the opener 12 is pulled, unless otherwise indicated. Arrow 24 of FIG. 4 may be used as a general indication of the forward working direction, but it should be appreciated that the direction indicated by the arrow 24 angles somewhat into the two-dimensional drawing plane due to the aforementioned angled orientation of the disc 16 relative to the forward working direction of the seeder.

A front bottom corner 26 is defined at the lower end of the scraper edge 23 where it meets with a bottom edge 28 of the scraper body 22, which extends rearward from the front bottom corner 26 and obliquely away from the trailing face 12a of the disc 12. The bottom edge 28 extends within a generally horizontal plane situated a distance above a lowermost point 30 in the rotational path of the disc's periphery 12b, which defines a bottommost point of the primary furrow trench formed in the soil by the opener. A pair of mounting holes 32 in the scraper body adjacent to, but spaced from, a top edge 34 thereof are positioned to align with respective holes 36 in the boot 20. Threaded fasteners (not shown) are engaged through the aligned holes in the scraper body and the boot to mount the scraper device 10 and position the bottom edge 28 of the scraper body upward from the lowermost point 30 in the disc periphery's rotational path about the axle 18 in a horizontal orientation.

The scraper body 22 has a bend line 38 at a distance situated rearward from the scraper edge 23, at or near a rearmost end of the bottom edge 28 but forwardly of a trailing rear edge 40 of the scraper body. This bend line 38 spans the full height of the scraper body from the bottom edge 28 up to the top edge, and denotes the boundary between a front portion of the scraper body that defines the leading scraper edge 23, and a distinctly angled rear portion of the scraper body in which the mounting holes 32 are defined. Rearward of the bend 38, the angle of the rear portion of the scraper body 22 relative to the disc is lesser than the oblique angle at which the front portion of the scraper resides relative to the disc. The rear portion thus lies more parallel to the plane of the disc than the front portion, which needs to lie at an oblique angle to create the effective scraping action at the leading edge 23. The term "bend line" is used to denote the overall bent shape of the scraper body that results from this angular deviation between the planes of the front and rear portions, whether this angular deviation is created by an actual bend in a singular piece of metal plate, or by welded attachment of two plates in non-coincident planes to respectively define the front and rear portions of the scraper body.

The product delivery tube 16 depends downwardly between the disc 12 and the scraper body 22 a short distance forward of the rear edge 40 thereof, but spaced back from the bend line 38. As shown in the drawings, the rear portion of the scraper body may be divided into upper and lower areas residing at discrete angles to one another so that the upper area with the mounting holes is appropriately oriented for flush placement against the boot or other scraper mount. In the illustrated embodiment, the upper area leans outwardly away from the disc moving toward the top edge 34 in order to match a corresponding tilted orientation of the outer side of the boot 20.

In operation, the opener 10 is pulled in the forward working direction 24 with the disc 12 disposed at an oblique acute angle relative angle thereto, thereby forming a furrow in the earth by disrupting the soil. The scraper body 22 extending laterally from the trailing face 12a of the disc 12 displaces soil outward away therefrom, which with the bottom edge 28 of the front portion of the scraper body reaching outward beyond the shadow of the disc within a generally horizontal plane, creates a generally horizontal seed shelf in the side of the furrow the trailing face 16a is oriented to face. The product delivery tube 16, carrying the boot 20 at its bottom end, places the discharge outlet of the boot 20 between the scraper body 22 and the trailing face 12a of the disc 12, and the outlet of the boot is positioned drop product (e.g. seed or fertilizer) either onto the shelf that is cut in the side of the primary disc furrow by the scraper body 22, or into the bottom of the primary furrow itself, depending on the desired placement of the particular product. A second product delivery tube (not shown) may be included to likewise reach down into the space between the disc and the rear portion of the scraper body to deliver a second product onto the opposite one of either the shelf or the furrow bottom, thereby enabling delivery of fertilizer to the furrow bottom and seed to the elevated shelf, or vice versa, via the two product tubes. In the illustrated embodiment, boot 20 is oriented to place its product outlet 20a in a rearward facing orientation dropping the product into the bottom of the furrow below the scraper-cut shelf.

The forgoing general description concerning the mounting of the scraper itself is generally consistent with that of Applicant's prior patent, referenced and incorporated herein above. However, the present invention differs notably therefrom in the addition of a novel insert between the front portion of the scraper body 22 and the trailing face 12a of the disc 12 to form a unique overall scraper assembly. The insert of the illustrated embodiment is a singular solid body 42 of low friction, self-lubricating, non-metal material, for example Ultra High Molecular Weight Polyethylene (UHMW). The insert body 42 has a leading edge 44 of matching angle and equal or near-equal length to the leading scraper edge 23. In a width direction measured between the disc 12 and the scraper body, a front section 46 of the insert body tapers forwardly to a point at the leading insert edge 44. In the illustrated embodiment, the tapered front section 46 spans a majority of the insert's overall length from the pointed front leading edge 44 to an opposing rear trailing end 47 of the insert body 42, thus giving the insert an overall wedge-like shape. The taper angle of the insert body's front portion, i.e. the angle of convergence between its inner disc-facing and outer scraper-facing sides, generally matches the oblique angle between the disc 12 and the front section of the scraper body 22.

On each side of the insert body, a boundary edge 48 denotes a border between the tapered front section and a less tapered or non-tapered rear section 50 of the insert body. The orientation of this boundary edge 48 matches that of the scraper body's bend line 38, and the length of the insert body's front section measured from the leading insert edge 44 to the boundary edge 48 is comparable to, but slightly shorter than, the corresponding length measurement of the scraper body's front portion from the leading scraper edge 23 to the bend line 38. In the installed position of the insert body 42, the boundary edge 48 of the insert body 42 is aligned with the bend line 38 of the scraper body 22, and the scraper-facing outer side of the insert body's front section is placed flush against the inner disc-facing side of the scraper body's front portion, whereby the slightly shorter length of the insert body's front section relative to the front portion of the scraper body 22 places the leading insert edge 44 in close proximity and parallel relation to the leading scraper edge 23 at a short distance trailing behind same. The insert thus spans a nearly entire length of the scraper body's front portion in the space between the scraper and the disc. As perhaps best shown in FIG. 3, the width of the insert also occupies substantially an entire width of the gap space measured between the disc and the front section of the scraper body in the aforementioned width direction.

Similarly, with a leading edge 44 of equal or nearly equal length to the scraper's leading edge 23, and with a bottom end of the insert residing flush or nearly flush with the bottom edge 28 of the scraper's front portion, the insert body 42 spans a nearly full height of the scraper body's front portion in the space between the scraper and the disc. As shown however, the insert body 42 may be taller at the leading edge 44 thereof than at areas further back therefrom as a result of a concave curvature provided at a top end 52 of the insert body 42 to provide radial clearance between the axle hub assembly 14 of the disc 12 and the top end of the insert body 42. However, even with this axle hub clearance space, the insert body 42 still spans a substantial majority of the scraper's height over the entire length of the insert body from its leading edge 44 to opposing trailing end 47. The front section of the insert body 42 features a pair of fastening holes 54 passing through, or at least into, the insert body 42 from the outer scraper-facing side thereof in order to receive a pair of fasteners 56 through a pair of matching fastener holes 58 in the front portion of the scraper body in order to hold the insert in its installed position against the inner disc-facing side of the scraper body.

Installed in this fashion, the insert body 42 occupies a near entirety of the space between the disc 12 and the front portion of the scraper body 22, thereby preventing accumulation and wrapping of straw or other trash in this space. Additionally, any seed, fertilizer or other furrow-bound product falling through delivery tube 16 that bounces forwardly when dropped onto the furrow shelf or furrow bottom is blocked by the trailing rear end 47 of the insert body from entering the tapered space between the disc and the angled front portion of the scrape. Accordingly, such errant seed thus cannot get caught up within this constricted space between the disc and the scraper near the leading scraper edge, and will instead reliably fall into the appropriate furrow location.

A further function of the insert is to prevent or mitigate premature wear of the scraper body's leading edge 23 by increasing the surface area of contact between the scraper assembly and the disc when the scraper body is subject to side loading pushing it toward the disc. Instead of the full side loading force being borne entirely by the thin strip of contact area between the scraper's leading edge 23 and the disc, the side loading force is distributed over a greater area of the disc by contact of the inner disc-facing side of the insert body 42 with the disc. Accordingly, the pressure exerted on the leading scraper edge 23 during such side loading is reduced, leading to an improved wear life of the scraper. The preferred use of low friction, self-lubricating UHMW material for the insert also minimizes disc wear by reducing friction between the disc and this enlarged contact area of the scraper assembly therewith compared to use of a metal insert or direct contact between a metal scraper and the disc.

In the illustrated embodiment, the rear section of the insert body reaches a short distance rearwardly past the scraper body's bend line 38 to maximize the amount of space occupied by the insert and thus maximize the available disc contact area of the insert, but stops short of the trailing rear end 40 of the scraper body in order to leave space for accommodating the product delivery tube 16, the delivery boot/scraper-mount 20, and the product being delivered therethrough. In other embodiments, the insert may stop short of the scraper body's rear section and occupy only the space between the disc and the scraper's front portion.

In the illustrated embodiment, the scraper body and the insert body collectively define a two-piece scraper assembly, where the separate and discrete insert body removably fastened to the scraper body forms an obstruction that juts inwardly toward the disc from the disc-facing inner side of the scraper to block straw, soil, seed, fertilizer or other material from entering and accumulating in the tapered space between the scraper body and disc just behind the leading scraper edge. This obstruction also increases the overall width of the scraper assembly at the insert-lined area of the scraper body relative to the leading edge of the scraper body, where the thickness of the assembly is instead defined solely by the plate thickness of the scraper body itself. This added thickness places the inner disc-facing side of the insert in close proximity to the disc to provide the enlarged contact area that decreases the pressure on the disc during side loading of the scraper assembly, and to provide the self-lubricated disc contact that reduces rotational resistance and wear on the disc during such side loading conditions. However, in other embodiments, such obstruction, pressure reduction and lubrication functionality may be provided by means other than a discrete and separate insert component. For example, a thicker or built-up area of the scraper body itself may be provided at the area of the scraper body trailing closely behind the leading scraper edge to perform the same obstruction and/or pressure-reducing function, and may be provided with a coated layer of low-friction self-lubricating material on the inner disc-facing surface of the thicker or built-up area.

Figure 7:
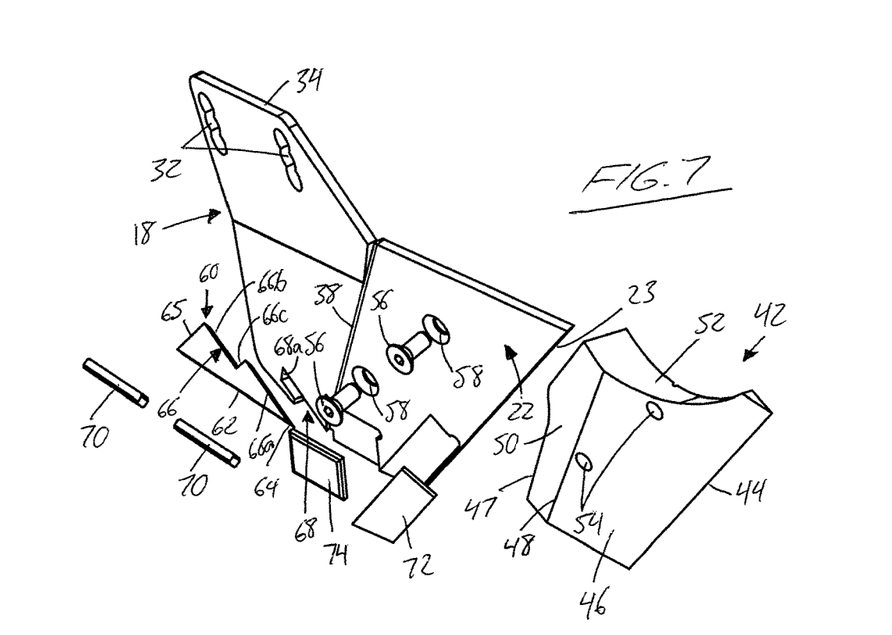
FIG. 7 is an exploded perspective side view of the scraper and insert member of the disc opener assembly of FIG. 1.
Figure 8:
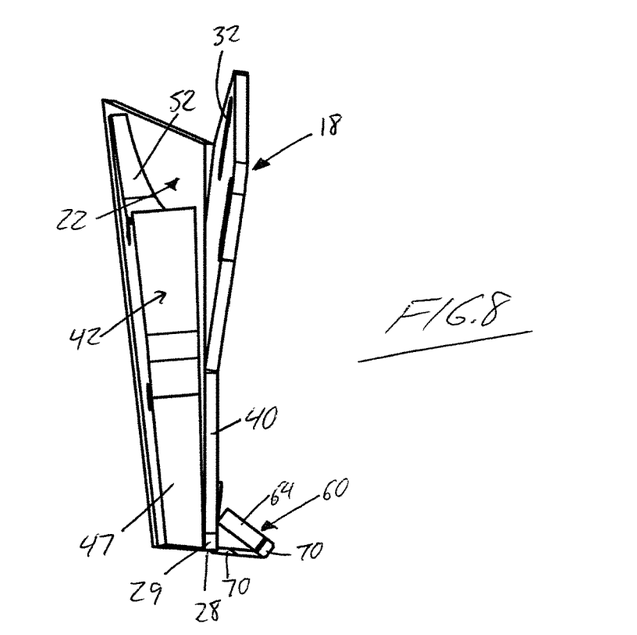
FIG. 8 is an assembled rear elevational view of the scraper and insert member of FIG. 7.

To reduce the cost of manufacturing a shelf-widening wing entirely of tungsten carbide or other wear material of greater hardness and wear resistance than the steel plate scraper member, the presently disclosed invention employs a metal (e.g. steel) wing member 60 that is initially defined separately of the scraper body 22 and is subsequently welded thereto into a useful working position spanning laterally from the scraper on the outer side thereof that faces away from the disc 12. This is best shown in the exploded view of FIG. 7. Wing member 60 is a piece of metal plate cut into a lightning bolt-like shape, with a linear outer edge 62 spanning from a pointed front tip 64 of the wing member 60 to a flat rear end 64 situated longitudinally opposite the tip. The perimeter of the wing member is completed by a step-profiled inner edge 66 residing opposite the outer edge and likewise spanning from the front tip 64 to the flat rear end 65. The step-shaped profile of inner edge 66 features linear front and rear segments 66a, 66b each diverging away from the linear outer edge 62 toward the flat trailing end 65, and a shoulder 66c that defines a single-step perpendicular transition between the two linear segments 66a, 66b.

The rear portion of the scraper body 22 features a mounting slot 68 angling obliquely upward into the scraper body at the rearmost end of the bottom edge 28 at or proximate the bend line 38. Using the terms front and rear half to denote the two portions of the wing member that respectively lead and trail the shoulder 66c thereof (and not to specifically mean that each such portion must denote a true 50% "half"), the front half of the wing member 60 is laterally inserted into the mounting slot 68 until the rear segment 66b of the step-profiled inner edge 66 abuts against the outer side of the scraper body's rear portion. The wing member 60 is then pushed longitudinally toward the trailing rear edge 40 of the scraper body 22 in order to abut the shoulder 66c of the wing member 60 against the closed end 68b of the mounting slot.

The slotted area of the scraper body thus serves as a pre-defined mounting seat for guiding placement of the wing member in its proper position for permanent attachment to the scraper body 22 by welding. Prior to such placement and welding of the wing member during production of the scraper, tungsten carbide or other wear inserts 70 of smaller width than the wing member itself are brazed to the linear outer edge 62 of the wing member 60 to provide improved wear life at what would otherwise be the most exposed and wear-prone area of the wing member, while using more cost efficient metal plate material for the bulk of the wing structure. The upward angling of the slot 68 serves to place the inner edge 66 of the wing member 60 at a rearwardly upward slope from the leading point 64 to the flat rear end 65, while the outer edge 62 of the wing member resides generally coplanar with the bottom edge 28 of the scraper body in a generally horizontal plane. The wing member thus slopes upwardly from its outer edge 62 toward the scraper member. This rearwardly and inwardly upward slope of the installed wing member creates a concealed space beneath the wing member and above the shared plane of the scraper body's bottom edge 28 and wing member's outer edge 62.

The horizontal bottom edge 28 of the scraper body's front portion terminates at the open end of the slot 68, and behind the slot, a sloped lower edge 29 of the scraper body's rear portion deviates from the horizontal orientation of the front portion's bottom edge 28, and instead slopes upwardly toward its intersection with the trailing rear edge 40 of the scraper body. The lower edge's angle of inclination matches the rearwardly upward slope of that shared by the slot 68 and the inner edge 66 of the wing member 60. Accordingly, the sloped lower edge 29 leaves an open space under the rear portion of the scraper body and above the plane of the front portion's bottom edge 28 so that product destined for the seed shelf can be directed into the concealed space beneath the wing to reach the wing-cut outermost end of the furrow shelf.

The wear members 70 are brazed to the wing member 60 prior to welding thereof to the scraper body. The width of the wing member between its carbide protected outer edge 62 and its inner attachment edge 66 acts to space the pre-installed wear members 70 from the area at which the wing member will be welded into place on the main scraper body. This reduces exposure of the brazed joints between the wing member and wear members to the heat of the welding process to better ensure that a strong bond remains at the brazed connection of the wear members. As shown, additional wear inserts 72, 74 of tungsten carbide or other suitably hard wear material may be brazed to the outer side of the scraper body along the leading edge 23 and bottom edge 28 at the front portion of the scraper body to likewise reinforce these exposed edges against premature wear.

While the forgoing description includes placement of the front portion of the scraper body 22 at a sufficient angle to the disc to cut a shelf into the side of the main disc furrow, whereby the wing projecting further outwardly from the scraper at the rear portion thereof serves to widen a lower part of the already cut shelf, as described in Applicant's aforementioned prior patent, it will be appreciated that the scraper may alternatively be oriented relative to the trailing side of the disc so that the entire scraper body, except for the separately attached wing member, rides entirely within the shadow of the disc so that the wing member instead cuts a slot into the side of the discs primary furrow, as described in the other incorporated reference.

In addition, it will be appreciated that the "generally horizontal" orientation of the scraper's bottom edge 28 and wing's outer edge 62, and the corresponding "generally horizontal" orientation of the resulting seed shelf is used to distinguish the more horizontal orientation of these components relative to the vertical depth of the primary furrow so that the shelf is a laterally widened area of the furrow, and is not intended to denote that these scraper features and resulting seed shelf must not deviate from true horizontal more than a certain threshold. For example, the shelf may slope downwardly toward its outermost terminus to encourage the shelf-delivered product further toward this end of the shelf to minimize potential falling of the shelf-delivered product into the bottom of the primary furrow.

It will also be appreciated that the insert body 42 and the benefits and advantages thereof may be put to use regardless of whether the unique wing construction is employed, and vice versa. While the illustrated embodiment features a singular solid insert body made uniformly and entirely of a single constituent material, other embodiments may alternatively employ a multi-piece and/or multi-material insert construction, for example using a coating layer to provide a low-friction, self-lubricating surface at the inner disc-facing side of the insert while an underlying base material forms is fastened or attached to the scraper body. While the illustrated embodiment uses threaded fasteners for releasable coupling of the insert body to the scraper, thereby enabling simple replacement of a worn or damaged insert, other embodiments may employ other means of attachment, permanent or removable.

Since various modifications can be made in my invention as herein above described, and many apparently widely different embodiments of same made, it is intended that all matter contained in the accompanying specification shall be interpreted as illustrative only and not in a limiting sense.

The invention claimed is:

1. A furrow opener comprising:
a disc arranged to be displaced across an area of ground in a forward working direction to open a primary furrow in the ground;
a scraper assembly comprising:
a scraper body extending generally rearward from a leading scraper edge of the scraper body to a rear trailing edge of the scraper body, the leading scraper edge of the scraper body being supported alongside the disc in contact or proximity thereto to scrape soil buildup therefrom; and
an obstruction carried in a position trailing closely behind the leading scraper edge on an inner side of the scraper body facing the disc, said obstruction spanning at least a majority of a length of the leading scraper edge and providing the scraper assembly with an increased thickness at the position of the obstruction relative to a thickness of the scraper assembly at the leading scraper edge;
wherein the obstruction is defined by an insert body that is separate and distinct from the scraper body, spans at least a majority of a gap width measured between the scraper body and the disc at the location of said obstruction, and occupies a space delimited between said scraper body and said disc at an angled portion of said scraper body that extends rearward from the leading scraper edge at an oblique angle to the disc.

2. The furrow opener of claim 1 wherein the obstruction comprises a different and distinct material composition than a material composition of the scraper body at the leading scraper edge thereof.

3. The furrow opener of claim 1 wherein the obstruction comprises polymeric material.

4. The furrow opener of claim 1 wherein the obstruction comprises self-lubricating material.

5. The furrow opener of claim 1 wherein the obstruction comprises low friction material, at least at an inner disc-facing side thereof.

6. The furrow opener of claim 1 wherein the obstruction comprises a material of lesser friction coefficient than a constituent material of a remainder of the scraper body, at least at an inner disc-facing side of said obstruction.

7. The furrow opener of claim 1 wherein the obstruction comprises ultra-high molecular weight polyethylene.

8. The furrow opener of claim 1 wherein the obstruction tapers in shape toward the leading scraper edge.

9. The furrow opener of claim 1 where said insert body tapers toward a leading edge of said insert body at taper angle that matches an angle of convergence between the disc and the angled portion of the scraper body toward the leading scraper edge.

10. The furrow opener of claim 1 wherein the obstruction is carried by the scraper body.

11. The furrow opener of claim 10 wherein the obstruction is releasably fastened to the scraper body.

12. A furrow opener comprising:
a disc arranged to be displaced across an area of ground in a forward working direction to open a primary furrow in the ground;
a scraper assembly comprising:
a scraper body extending generally rearward from a leading scraper edge of the scraper body to a rear trailing edge of the scraper body, the leading scraper edge of the scraper body being supported alongside the disc in contact or proximity thereto to scrape soil buildup therefrom; and
an obstruction carried in a position trailing closely behind the leading scraper edge on an inner side of the scraper body facing the disc, said obstruction spanning at least a majority of a length of the leading scraper edge and providing the scraper assembly with an increased thickness at the position of the obstruction relative to a thickness of the scraper assembly at the leading scraper edge;
wherein the scraper body comprises a front portion extending from the leading scraper edge in a position trailing same, and a rear portion continuing rearward from the front portion at a different relative angle to the disc than said front portion, wherein the obstruction spans at least a majority of said front portion of the scraper body, and less than a majority of said rear portion of the scraper body.

13. The furrow opener of claim 12 comprising a product delivery tube reaching downward into a space between the disc and the rear portion of the scraper body to deliver product into the furrow at a location trailing behind the obstruction.

14. The furrow opener of claim 12 wherein the obstruction comprises a different and distinct material composition than a material composition of the scraper body at the leading scraper edge thereof.

15. The furrow opener of claim 12 wherein the obstruction comprises polymeric material.

16. The furrow opener of claim 12 wherein the obstruction comprises self-lubricating material.

17. The furrow opener claim 12 wherein the obstruction comprises low friction material, at least at an inner disc-facing side thereof.

18. The furrow opener of claim 12 wherein the obstruction comprises a material of lesser friction coefficient than a constituent material of a remainder of the scraper body, at least at an inner disc-facing side of said obstruction.

19. The furrow opener of claim 12 wherein the obstruction comprises ultra-high molecular weight polyethylene.

20. The furrow opener of claim 12 wherein a front section of the obstruction, situated between the disc and the front portion of the scraper body, tapers in shape toward the leading scraper edge.

21. The furrow opener of claim 12 where said obstruction tapers toward a leading edge of said obstruction at taper angle that matches an angle of convergence between the disc and the front portion of the scraper body toward the leading scraper edge.

22. A furrow opener comprising:
a disc arranged to be displaced across an area of ground in a forward working direction to open a primary furrow in the ground;
a scraper assembly comprising:
a scraper body extending generally rearward from a leading scraper edge of the scraper body to a rear trailing edge of the scraper body, the leading scraper edge of the scraper body being supported alongside the disc in contact or proximity thereto to scrape soil buildup therefrom; and
a self-lubricating material carried at an inner side of the scraper body that faces the disc for lubricated contact with the disc when the scraper is subjected to side loading forces acting on said scraper assembly toward said disc.

23. The furrow opener of claim 22 wherein the self-lubricating material is provided by an insert body that is separate and distinct from the scraper body and is carried in a position located between the disc and the scraper body in close trailing relation to the leading scraper edge.

24. The furrow opener of claim 23 wherein the insert member is composed entirely of said self-lubricating material.

25. A method of producing a winged scraper for a disc opener, said method comprising:
  providing a scraper body, a wing member formed separately of said scraper body, and one or more edge members of greater material hardness than said wing member; and
  with the wing member having the one or more edge members pre-brazed thereto at one or more outer edges thereof by one or more brazed joints, welding said wing member to the scraper body at an inner edge of the wing member that resides in a spaced condition across said wing member from said one or more outer edges thereof, whereby the spaced condition between the outer edges featuring the pre-brazed edge members and the inner edge being welded to the scraper body reduces exposure of said one or more brazed joints to heat during welding of the wing member to the scraper body.

26. A method of producing a winged scraper for a disc opener, said method comprising:
  providing a scraper body and a wing member formed separately of said scraper body; and
  placing the wing member into a predefined seat in the scraper body to position said wing-member in a predetermined position ready for permanent attachment to said scraper body in a useful position projecting laterally from said scraper body at an outer side thereof.

27. A furrow opener produced in accordance with claim 26, said furrow opener comprising:
  a disc arranged to be displaced across an area of ground in a forward working direction to open a primary furrow in the ground;
  a winged scraper produced in accordance with claim 26, of which:
    the scraper body extends generally rearward from a leading scraper edge of the scraper body to a rear trailing edge of the scraper body, the leading scraper edge of the scraper body is supported alongside the disc in proximity thereto to scrape soil buildup therefrom, and the outer side of the scraper body resides oppositely of the disc and faces outwardly away therefrom;
    the wing member is received in the pre-defined seat of the scraper body and is affixed thereto in the useful position extending laterally therefrom at the outer side thereof.

* * * * *